INVENTOR.

United States Patent Office 3,034,721
Patented May 15, 1962

3,034,721
ELECTRONIC MULTIPLYING ARRANGEMENT IN COMBINATION WITH A MECHANICALLY ACTUATED BOOKKEEPING MACHINE
Joachim Schulze, Limbach-Oberfrohna, Germany, assignor to VEB Buchungemaschinenwerk Karl-Marx-Stadt, Germany
Filed May 13, 1959, Ser. No. 812,942
Claims priority, application Germany June 6, 1956
13 Claims. (Cl. 235—160)

This application is a continuation-in-part of now abandoned application Serial No. 630,487.

This invention relates to accounting machines and in particular to accounting machines with a multiplying device where a product is formed by successive multiplication of the multiplicand by the digits of the multiplier with a place transfer of the multiplier and product memory devices.

It is an object of this invention to form a product by the multiplication of factors with an unlimited number of digital places in a memory device the size of which depends solely upon the size of the multiplicand.

In accordance with the invention each counter in the product memory device is responsive to numbers in accordance with their digital place.

The product is read out from the resulting memory device of a multiplication memory device numerically while the product is being formed. The device further converts the electrically indicated numerals into mechanically represented numerical values.

Other objects and advantageous features are contained in the specifications and the drawings.

The various features of novelty which characterize the invention are pointed out with particularity in the claims annexed to this specification and made a part thereof. For a better understanding of this invention, its operating advantages and specific objects obtained by its use, reference should be had to the accompanying drawings and descriptive matter in which there is illustrated and described a preferred embodiment of the invention.

The same reference symbols are employed throughout the drawings to denote identical circuit components and identical mechanical means. Those parts of the circuit that are known to persons skilled in the art are not detailed, are not part, per se, of the present invention and are shown only in block circuit diagrams.

Figure 1:
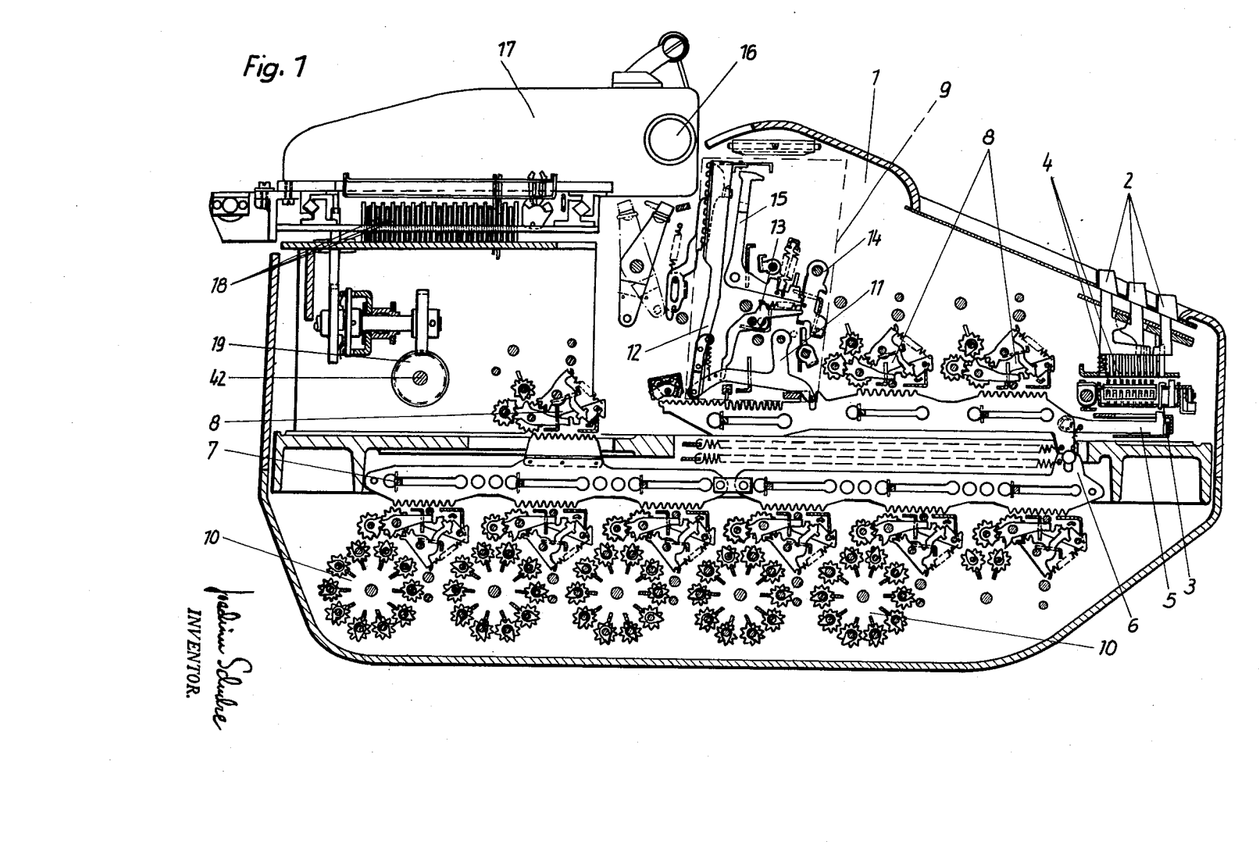
FIG. 1 is a sectional view of the interior of an accounting machine.
Figure 2:
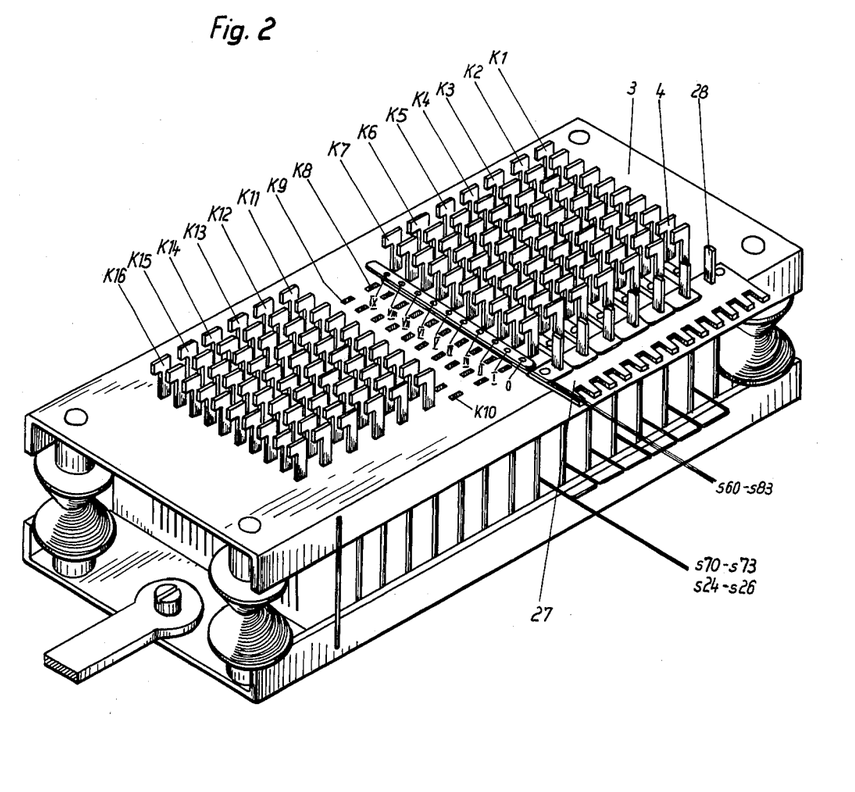
FIG. 2 is a presentation of a setting pin carriage as used in the accounting machine of this invention.

The particular components as used in the block diagrams are illustrated in chapters 18 and 19 of "Electron Tube Circuits" by Seeley, 1st edition, published by McGraw Hill Publishing Company. FIG. 19–1 discloses a gate. FIGS. 19–14, 18–17 and 18–8 disclose trigger circuits.

FIGS. 19–15 discloses a flip-flop. FIGS. 19–20, 19–21 and 19–22 describe ring circuits. The text near these figures describes the operation of the circuits.

*Accounting Machine*

The accounting machine 1 (FIGURE 1) operates on the principle of the introduction of a number by means of a keyboard 2 (FIGS. 1 and 3), a keying carriage 3 (FIGS. 1, 2, 3, and 4) with setting pins 4 that are set by the keys 2 and serve as stops limiting the travel of the racks 5, 6, and 7 (FIG. 1).

Racks 5 and 7 transfer the keyed-in numbers to the clearing mechanism 8 and the printing device 9, while the numbers and results of the individual completed calculating operations are transferred to the register bank 10 by the racks 6 and 7. The said printing device consists of a hinged lever 11, a type bar 12, a lever 13, a detent 14, and a spring-loaded hammer 15. When the drive of the accounting machine 1, not shown, shifts the rack 5 to one of the setting pins 4, the hinged lever 11 moves the type bar 12 in front of the printing platen 16, so that keyed-in entries or factors can be printed, while the results secured by the displacement of the rack 5 together with the racks 6 and 7 or the values stored in the register bank 10 are printed by the hammer 15 striking the type bar 12. The functions to be performed by the accounting machine 1 can be controlled by the adjustable carriage stops 18 on the accounting-machine carriage 17, so that the said carriage 17 can tabulate automatically. The accounting-machine carriage 17 is moved by the carriage drive 19. The setting-pin carriage 3 (FIGS. 1, 2, and 3) of the accounting machine 1 consists of the setting pins 4 arranged in columns, each column representing one decimal place of an entry or factor and consisting of ten setting pins 4, corresponding to the decimal system. Of these columns K1–K16 the columns K1 to K7 are intended for entries or factors, while the columns K8 to K16 are intended for the products calculated in the electronic multiplying device. When each of the keys 2 (FIGS. 1 and 3) is depressed, a yoke 22 is pushed down by the lugs 23 on the keys 2, carrying with it a lever 24, since the lever 24 is pressed against the yoke 22 by a spring 25. This movement of the lever 24 causes the tooth 26 on lever 24 to engage a gear rack 27 of the setting-pin carriage 3, moving all the lugs 28 on the setting-pin carriage 3 downward. A spring 21 (FIG. 4) mounted on the setting-pin carriage 3 normally pulls the setting-pin carriage 3 toward the left, so the lug 28 (FIG. 3) will come up against a fixed stop 29. After each movement of the keys 2 the spring 25 draws the lever 24 and the yoke 22 to their initial positions, so that the tooth 26 of lever 24 no longer engages the rack 27, so that the spring 21 can draw the setting-pin carriage 3 to the left until the next lug comes up against stop 29. In this manner the setting-pin carriage 3 has been shifted one decimal place, beginning with the highest decimal place of the entry or factor to be keyed into the machine.

This shift of the setting-pin carriage 3 from one decimal place of higher rank to a decimal place of lower rank is repeated until all the digits of the entry or factor have been keyed in.

Figure 3:
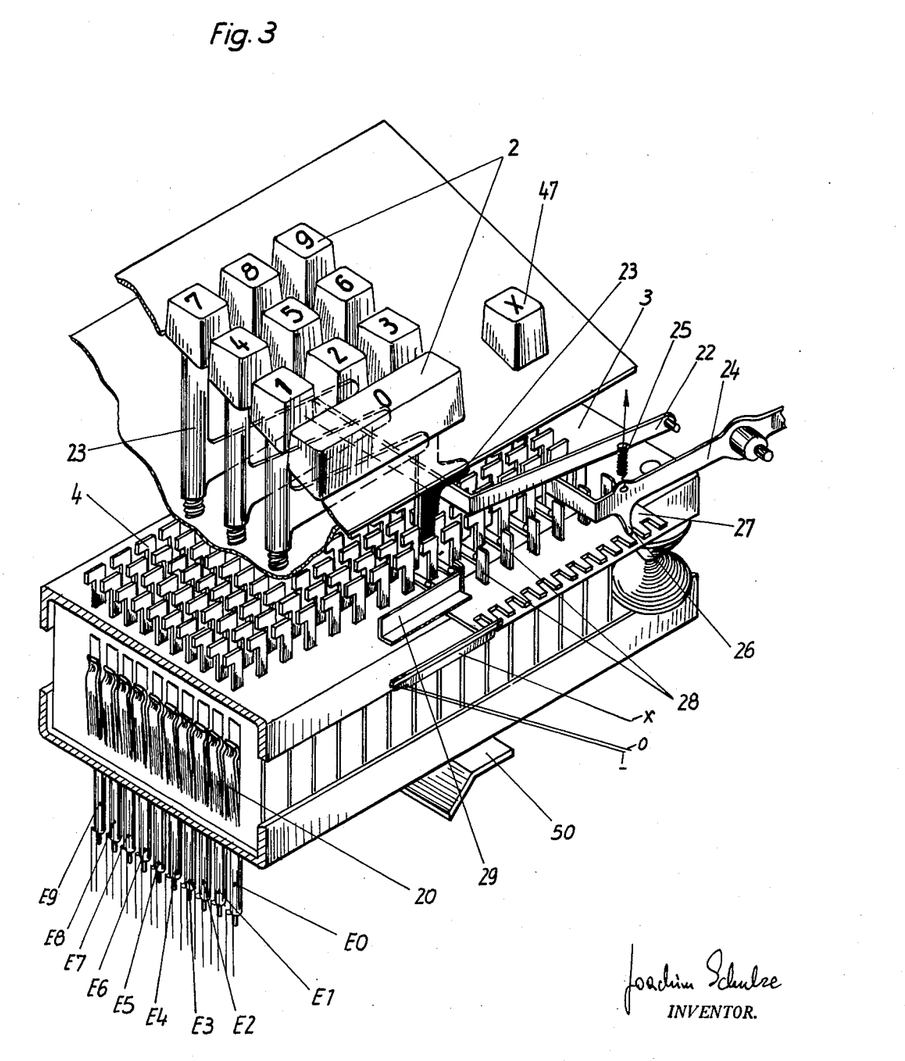
FIG. 3 is a presentation of a keyboard with a carriage shift device as outlined in this invention.

Once all the decimal places of the entry or factor have been keyed into the setting-pin carriage 3 in this manner, the setting-pin carriage has been moved to the left by the action of spring 21 (FIG. 4) upon it, so that the column K8 (FIG. 2) of the setting pins 4 is positioned above the magnets E0–E9 (FIG. 3).

Figure 4:
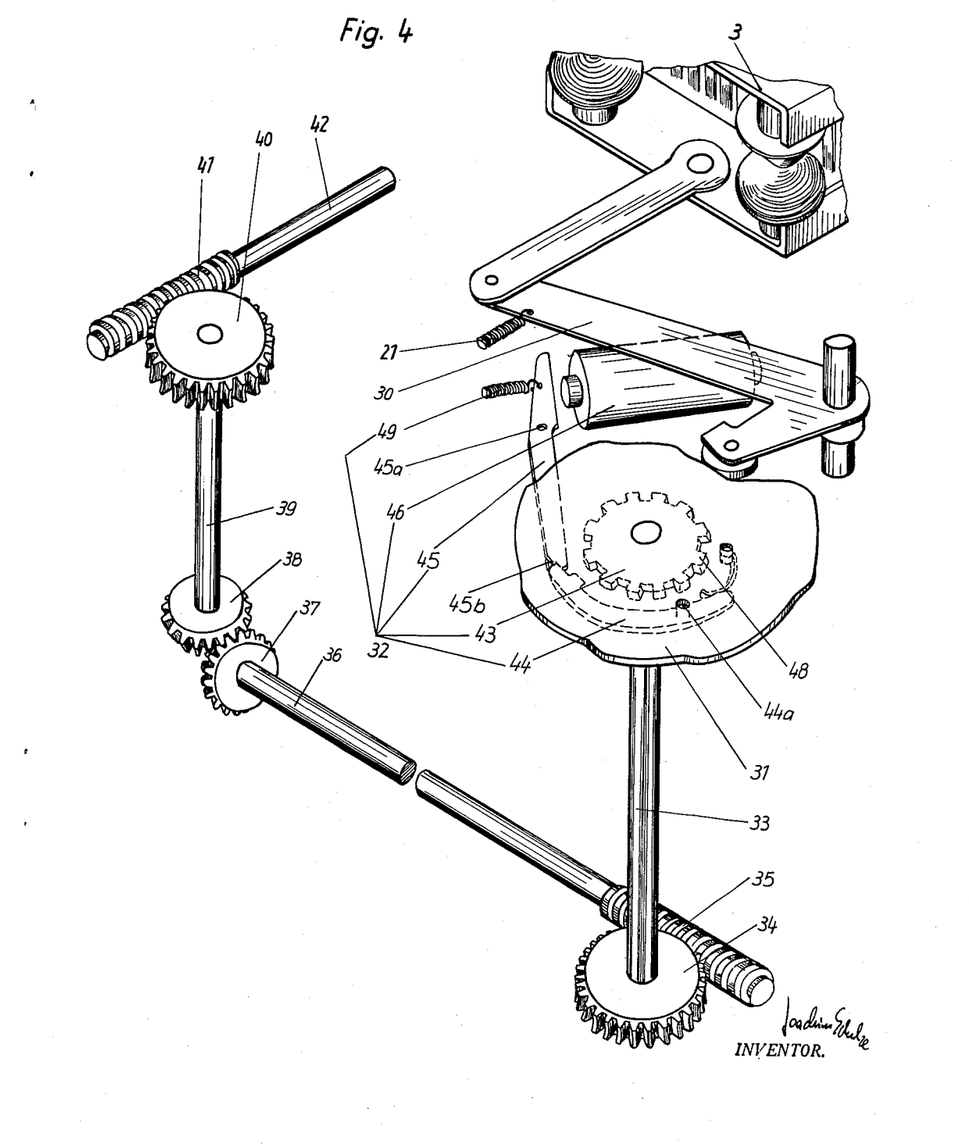
FIG. 4 is a presentation of a device for returning the keying carriage in FIG. 3 to its original position.

In their depressed position the setting pins 4 of the columns K1 to K7 (FIG. 2) successively close the contacts 0 to IX (FIGS. 2 and 5) of the contact groups THM$k$, UM$k$, TM$k$, HM$k$, UM$d$, TM$d$, and HM$d$ of the multiplier and multiplicand memory devices, which are connected to an initial circuit arrangement—to be described later—by the lines $s60$ to $s69$ with flip-flops FF20–29 of a ring counter RC1 that is part of the multiplying memory device, and from which circuit the lines s70, s71, s72, and s73 lead to the step-by-step switching device (FIG. 6) to be described later. The contact groups UMd, TMd, and HMd (FIG. 5) are connected to the lines s74–s83 (FIGS. 2 and 5) of the flip-flops FF39–FF30 of a ring counter RC2 that is part of the multiplicand memory device and to the lines s24, s25, and s26 of the first circuit arrangement (FIGS. 5 and 2), which connects the contact groups UMd, TMd, and HMd of the multiplicand memory device to the flip-flops FF10, FF11, and FF12. The depression of the setting pins 4 (FIGS. 2 and 3) by the said keys 2 (FIGS. 1 and 3) of the accounting machine 1 feeds the keyed-in amounts into the electronic multiplying device (FIG. 5), so that the factors can be electronically multiplied together, while the factors can be simultaneously printed, as described above. After a key 47 (FIG. 3) is depressed, the movement of the setting-pin carriage 3 (FIGS. 1, 2, 3, and 4) to the right is started, the rack 27 (FIGS. 3 and 2) alternately actuating a switch X (FIGS. 3 and 5), which either begins or interrupts multiplication. The drive (FIG. 4) that produces the movement of the setting-pin carriage 3 to the right comprises a cam-follower lever 30 that is connected to the setting-pin carriage 3, a cam plate 31, a single-revolution coupling generally designated 32, and the drive components 33 to 40, which are connected to the drive-motor shaft 42 (FIGS. 1 and 4). The cam-follower lever 30 explores the periphery of the cam plate 31, which rotates during multiplication, and as the latter turns it is intermittently deflected, in accordance with the offset cam shape of the cam plate 31, up to a maximum deflection, this motion being transmitted through the cam-follower lever 30 to the setting-pin carriage 3, so that the latter is returned step by step to the right to its initial position during one complete revolution of the cam plate 31, being held there by the stops 28 and 29 (FIG. 3). The single-revolution coupling 32 (FIG. 4) consists of a toothed wheel 43 mounted on the shaft 33, a spring-loaded pawl 44 pivotally mounted at 44a on the cam plate 31, a magnet armature 45, which serves as a stop for the pawl 44, and an electromagnet 46, whose energizing circuit is closed by a key 47 (FIGS. 3 and 6) that switches on the multiplying device. The toothed wheel 43 (FIG. 4) on the shaft 33 is continuously turned by the drive described. As multiplication is begun, the magnet 46 is energized, the magnet armature 45 pivotally mounted at 45a is attracted, and the pawl 44 is released to engage tooth 48 in the toothed wheel 43, thus making the cam plate 31 turn with the latter. When the key 47 (FIGS. 3 and 6) is released, the circuit of the magnet 46 is broken, allowing a spring 49 to pull the armature 45 away from the magnet 46 and causing the pawl 44 to strike the magnet armature 45 after the completion of one revolution by the cam plate 31 and be lifted away from the toothed wheel 43 by the surface 45b.

In this return of the setting-pin carriage 3 (FIGS. 1, 2, 3, and 4) the setting pins 4 (FIGS. 2 and 3) of the columns K1–K7, which are assigned to the factors, are canceled out a column at a time by the setting pins 4 striking a read-in plate 50, and thus being pushed back into the setting-pin carriage 3. The contacts 0–IX (FIGS. 2 and 5) of the contact groups UMk, TMk, HMk, THMk, UMd, TMd, and HMd are opened by this action. In this manner the stops 28 (FIG. 3) are also returned to their initial positions so that the stops 28 and 29 prevent the setting-pin carriage 3 from moving to the left.

In this step-by-step movement of the setting-pin carriage 3 to its initial position the product is calculated step by step in the electronic multiplying device (FIG. 5) and is transferred step by step to the columns K8–K16 (FIG. 2) of the setting pins 4 of the setting-pin carriage 3 as the electronically energized magnets E0–E9 (FIGS. 3, 5, and 7) attract the setting pins 4 (FIG. 3) of the said columns K8 to K16, which pass over them successively. If the column K8 of the setting-pin carriage 3 is positioned above the magnets E0 to E9, the setting pin 4 that corresponds to the units place UPr of the product is attracted. As the setting-pin carriage 3 continues its return, the setting pins 4 of the column K9 are positioned above the magnets E0 to E9, while the setting pins 4 of the column K8 are pushed back into the setting-pin carriage 3 by the read-in plate 50. The process is repeated until all the places of the product have been transferred to the setting-pin carriage 3. After the last place of the product has been read in, the setting pin carriage 3 has reached is initial position.

The racks 5, 6, and 7 (FIG. 1), which transfer the values corresponding to the position of the setting pins 4 into the printing device 9 or into the register banks 10 as described above, run up against the setting pins 4 of the setting-pin carriage 3, which are set by the magnets E0–E9, so that these values can be printed or stored in the register banks 10.

Factor Memory Device

The multiplier memory device Mk (FIG. 5) and the multiplicand memory device Md of the electronic multiplying device are electromechanical storages in which contacts 0–IX, connected in parallel, serve to represent the digits of a decimal number and constitute a contact group. The contact groups in the multiplier memory device Mk are so arranged that the contact group UMk stores the units place, the contact group TMk stores the tens' place, the contact group HMk stores the hundreds' place, and the contact group THMk stores the thousands' place, the corresponding numerical value being reproduced by the contact that is closed in the 0–IX contacts of the corresponding contact group.

The contact groups UMk, TMk, HMk and THMk are selected for forming the product by the step-by-step switching device SR (FIGS. 5 and 6), to be described later, as its contacts $a_{10}$, $b_{10}$, $c_{10}$, and $d_{10}$ (FIGS. 5 and 6) are successively closed. The contacts 0–IX (FIG. 5) of each contact group UMk, TMk, HMk, and THMk are closed by depressing a digit key 2 (FIGS. 1 and 3) of the accounting machine 1 in association with the setting-pin carriage 3 of the same accounting machine 1, the depressed key 2 being identical with one digit of the multiplier. The ring counter RC1 (FIG. 5), which is part of the multiplier memory device, routes the feed-in of the pulses coming from the multiplicand memory device Md to the contact groups UMk, TMk, HMk, and THMk selected by the step-by-step switching device SR.

Figure 5:
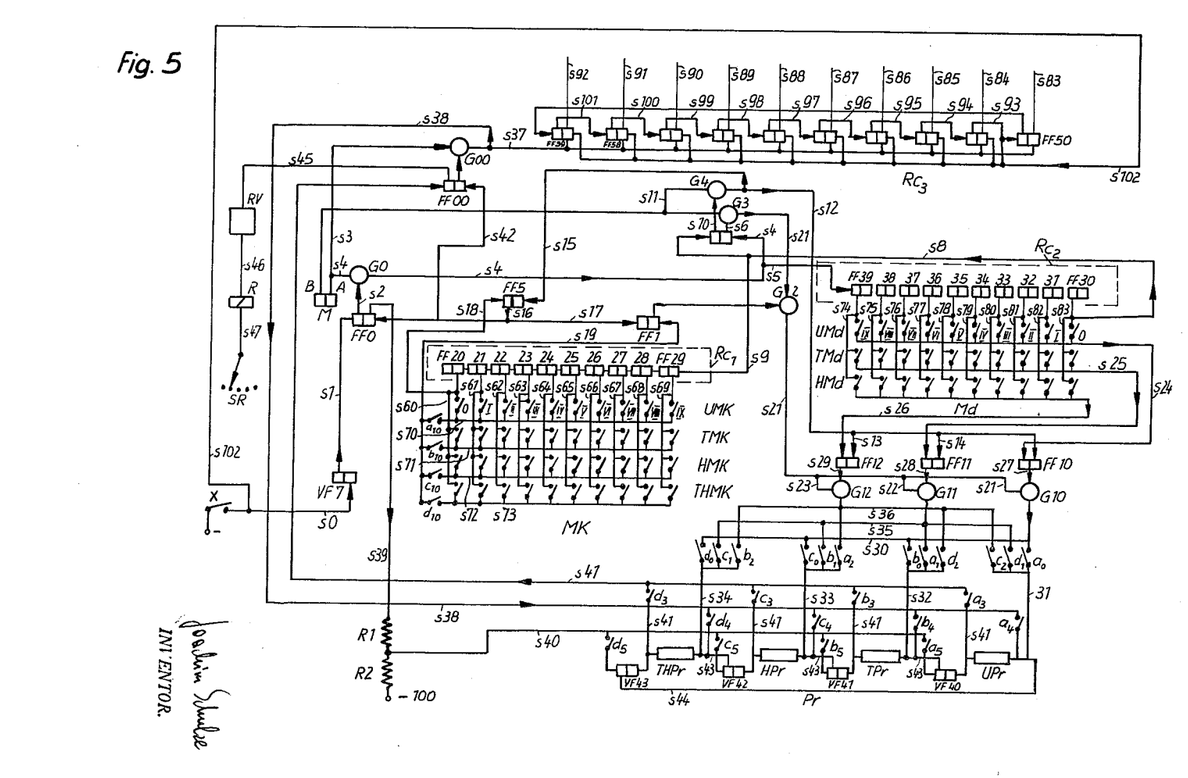
FIG. 5 is a schematic representation of an electronic multiplying device as used in the accounting machine of one embodiment of this invention.

The multiplicand memory device Md is built up like the multiplier memory device Mk. The contact group UMd receives the units' place, the contact group TMd takes tens' place, and the contact group HMd takes the hundreds' place of the multiplicand. The ring counter RC2 connected in series with the multiplicand memory device Md transmits the pulses fed in by the pulse generator M via the gate G0 to the contact groups Umd, TMd, and HMd of the multiplicand memory device Md.

Circuit Arrangement

A pulse generator M, producing series of A pulses alternating with B pulses which it also produces, a delay flip-flop VF7, a flip-flop FF0, and a gate G0 are the means employed to generate a sequence of pulses, these components being connected together via the lines s1, s2, s3, and s4. VF7 is connected by a line S0 to a switch X. Connected to these components is a first circuit arrangement with circuit components that interconnect the multiplicand memory device Md, the multiplier memory device Mk, and the product memory device Pr. Accordingly, the lines s5 and s4 connect a ring counter RC2, which is part of the multiplicand memory device Md, to the gate G0, while the multiplicand memory device M$d$ itself is connected via the line $s8$ to the flip-flop FF3 and via the lines $s8$ and $s9$ to a ring counter RC1, which is part of the multiplier memory device M$k$. From the flip-flop FF3 the line $s6$ leads to a gate G3, and the $s10$ to a gate G4. A line $s7$, from which a line $s11$ branches off to the gate G4, leads from the system B of the pulse generator M to the gate G3. The lines $s12$ and $s15$ connect the gate G4 to a flip-flop FF5, which is connected through the lines $s16$ and $s17$ to the flip-flops FF0 and FF1 and into which pulses from the multiplier memory device M$k$ are fed. Furthermore, gate G4 is connected via the line $s12$ to the flip-flop FF10, via the lines $s12$ and $s14$ to the flip-flop FF11, and via the lines $s12$ and $s13$ to the flip-flop FF12. The line $s19$ leads from the multiplier memory device M$k$ to the flip-flop FF1 and from there via the line $s20$ to a gate G2, to which a line $s21$, which also connects the gate G2 with the gate G10 via the lines $s21$ and $s22$ and with the gate G11 via the lines $s21$ and $s23$, leads from the gate G3. Coming from the multiplicand memory device M$d$, the line $s23$ feeds into the flip-flop FF10, the line $s25$ into the flip-flop FF11, and the line $s26$ into the flip-flop FF12, these flip-flops also being connected via the lines $s27$, $s28$, and $s29$ to the gates G10, G11, and G12. Gate G10 routes the incoming pulses via the lines $s30$, $s31$, $s33$, and $s34$ and the relay contacts $a_0$, $b_0$, $c_0$, and $d_0$ to the counters UP$r$, TP$r$, HP$r$, and T$h$P$r$ of the product memory device P$r$, while gate G11 routes them via the lines $s35$, $s31$, $s32$, $s33$, and $s34$ and the relay contacts $d_1$, $a_1$, $b_1$, and $c_1$ to the counters UP$r$, TP$r$, HP$r$, and T$h$P$r$ of the product memory device, and gate G12 routes them via the lines $s36$, $s31$, $s32$, $s33$, and $s34$ and the relay contacts $c_2$, $d_2$, $a_2$, and $b_2$ to the counters UP$r$, TP$r$, HP$r$, and T$h$P$r$ of the product memory device P$r$.

Figure 7:
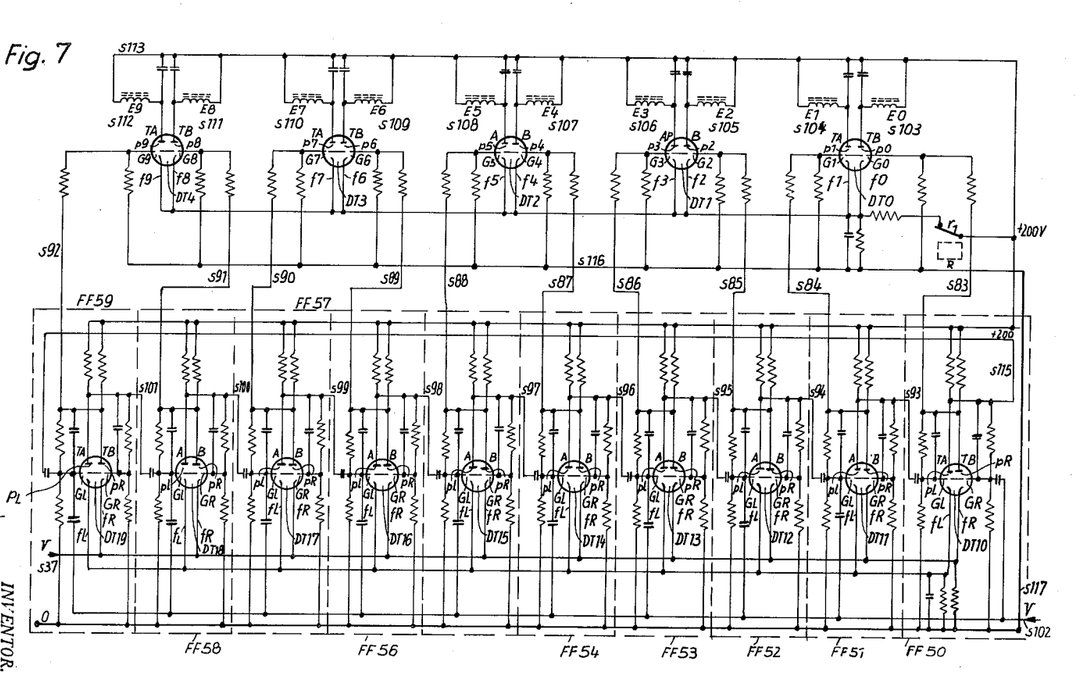
FIG. 7 is a schematic representation of a transfer device as used in the accounting machine in embodying this invention.

The second circuit arrangement is connected to the first circuit through the lines $s3$, $s39$, and $s40$. The line $s3$ runs from the system A of the pulse generator M to a gate G00, which is connected through the lines $s37$ and $s38$ to the relay contacts $a_4$, $b_4$, $c_4$, and $d_4$ of the step-by-step switching device SR, which are part of the counters UP$r$, TP$r$, HP$r$, and T$h$P$r$ of the product memory device P$r$, and through the line $s37$ to the cathodes $fR$ of the twin triodes DT19–10 (FIG. 7) of each flip-flop FF59–50 of the ring counter RC3 (FIGS. 5 and 7). A line $s41$ is attached to the flip-flop FF00, connecting the counters UP$r$, TP$r$, HP$r$, and T$h$P$r$ of the product memory device P$r$ via the relay contacts $a_3$, $b_3$, $c_3$, and $d_3$ to the flip-flop FF00, which can receive pulses from the flip-flop FF5 at the same time via the lines $s16$, $s17$, and $s42$. Furthermore, the flip-flop FF0 transmits pulses via the line $s39$, the resistor R1, the line $s40$, and the relay contacts $a_5$, $b_5$, $c_5$, and $d_5$ to the blocking units VF40 to VF43, which trip the latter, so that the pulses coming from a counter UP$r$, TP$r$, HP$r$, or T$h$P$r$ of the product memory device P$r$ cannot enter the ring counter RC3, which is connected in series with it when digits are transmitted from the product memory device P$r$, but pass from one of the counters UP$r$, TP$r$, HP$r$, and T$h$P$r$ via the lines $s43$ and $s41$ to the flip-flop F00, which is tripped, connecting the blocking units VF40–VF42 to the counters TP$r$, HP$r$, and T$h$P$r$ via the lines $s43$ and the blocking unit VF43 to the counter UP$r$ via the line $s44$. A line $s45$ leads from the flip-flop FF00 to a vacuum-tube amplifier RV, which energizes a relay R via the line $s46$ and switches the relays AR, BR, CR, and DR of a step-by-step switching device SR via the line $s47$.

Step-By-Step Switching Device

The step-by-step switching device SR (FIGS. 5 and 6) consists of the relays AR, BR, CR, and DR and the associated relay contacts. The relay AR comprises the contacts denoted by $a$ with numbered subscripts, the relay BR comprises the contacts denoted by $b$ with subscripts, the relay C comprises the contacts denoted by $c$ with subscripts, and the relay DR the contacts denoted by $d$ with subscripts. Of these contacts, $a_{10}$, $b_{10}$, $c_{10}$, and $d_{10}$ are provided in the first cricuit arrangement to select the contact groups of the multiplier memory device M$k$. The contacts $a_0$, $a_1$, $a_2$; $b_0$, $b_1$, $b_2$; $c_0$, $c_1$, $c_2$; and $d_0$, $d_1$, $d_2$ connect the multiplicand memory device M$d$ to the product memory device P$r$, while the contacts $a_3$, $a_4$, $a_5$; $b_3$, $b_4$, $b_5$; $c_3$, $c_4$, $c_5$; and $d_3$, $d_4$, $d_5$ are in the second circuit and serve to switch the product memory device P$r$ for the step-by-step readout of the product from the product memory device. Via the relay contacts $a_{11}$, $b_{11}$, $c_{11}$; $a_{12}$, $b_{12}$ the relays BR, CR, and DR that follow these contacts lexicographically are energized by a pulse coming from the vacuum-tube amplifier RV via the lines $s46$ and $s47$, while the relay AR is likewise energized via the line $s120$ and the contact $d_{11}$, which is closed when the step-by-step switching device SR is connected through, thus starting a new step-by-step switching cycle. The energizing of the relays AR, BR, CR and DR operates their respective contacts $a_{13}$, $a_{14}$; $b_{13}$, $b_{14}$; $c_{13}$, $c_{14}$; and $d_{13}$, $d_{14}$, so that the associated relays BR, CR, and DR continue to function and after one of the BR, CR, and DR relays is energized, the lexicographically preceding relay AR, BR, CR, or DR is disconnected.

If the multiplying key 47 is depressed, the relay AR is energized via the lines $s50$ and $s51$, thus closing the relay contact $a_{13}$, so that the relay contacts $b_{14}$, $c_{14}$, and $d_{14}$ in line $s52$ keep the relay AR energized. At the same time the relay contact $a_{12}$ is switched, so that a pulse coming from the vacuum-tube amplifier RV via the line $s47$ energizes the relay BR through the relay contact $a_{11}$, which is now closed, and the line $s53$. This switches the relay contact $b_{14}$, thus de-energizing the relay AR and opening the contacts $a_{13}$ and $a_{11}$, while the relay contact $b_{13}$ closes, and the relay BR remains energized via the relay contacts $b_{13}$, $c_{14}$, and $d_{14}$ in the line $s52$.

When the relay BR is energized, the relay contact $b_{12}$ is switched, so that the next pulse coming from the vacuum-tube amplifier RV via the relay contact $a_{12}$, the relay contact $b_{12}$, and the line $s54$ energizes the relay C. The latter's relay contact $c_{14}$ is switched, de-energizing the relay BR and switching the relay contacts $b_{13}$ and $b_{11}$, while the relay CR continues to function via the relay contacts $c_{13}$ and $d_{14}$ in the line $s52$. Relay CR also closes the relay contact $c_{11}$, so that the next pulse coming from the vacuum-tube amplifier RV via the line $s47$ energizes the relay DR via the contacts $a_{12}$, $b_{12}$, and $c_{11}$ and the line $s55$. The relay contact $d_{14}$ is switched, disconnecting the relay CR and switching the contacts $c_{14}$ and $c_{11}$, so that relay DR is kept energized through the relay contacts $a_{14}$ and $d_{13}$ in the line $s52$. The next pulse coming from the vacuum-tube amplifier RV again energizes the relay AR through the lines $s47$ and $s120$ and the closed contact $d_{11}$, this relay actuating its contacts denoted by the letter $a$ as described above, thus de-energizing the relay DR by opening the contact $a_{14}$. In the above-described connecting of the relays AR, BR, CR, and DR the relay contacts with the subscripts 0, 1, 10, 2, 3, 4, and 5 to the corresponding notations $a$, $b$, $c$, and $d$, whose functions has been described, are actuated, in addition to the relay contacts with the subscripts 11, 12, 13, and 14 for the same notations mentioned above.

Transfer Device

The transfer device, which is connected to the second circuit arrangement via the line $s37$, comprises a ring counter RC3, the twin triodes DT0–DT4, and the electromagnets E0–E9. The ring counter RC3 in turn is built up from 10 flip-flops FF59–FF50, each of the flip-flops FF59–FF50 containing one of the twin triodes DT10 to DT19 with the vacuum-tube systems TA and TB and thus can assume 2 stable conditions. In the initial position the ring counter RC3 is connected so that the TB vacuum-tube systems of the twin triodes DT19–DT11 of the flip-flops FF59–FF51 are conductive, and the TA vacuum-tube system of the twin triode DT10 of the flip-flop FF50 is conductive.

The said flip-flops FF59–FF50 are conductive in the right-hand halves of the triodes when a low potential is applied to the anode $pR$ of the TB vacuum-tube system of the twin triodes DT10–DT19, and a high potential is applied to the anode $pL$ of the TA vacuum-tube system. If the anode $pL$ of the TA vacuum-tube system is at a low potential and the anode $pR$ of the TB vacuum-tube system is at high potential, the flip-flops FF59–FF50 are conductive in the left-hand halves of their tubes. The flip-flops FF59–FF50 can be made right-hand or left-hand conductive by pulses that arrive at a cathode $fL$, $fR$ or a grid GL, GR, depending on the type of pulses of the TATB vacuum-tube systems of the said twin triodes, if this makes the potential of the GL or GR grid exceed a certain value. This value is called the cutoff. If this potential is lowered by pulses below this value, the respective TA or TB vacuum-tube system is blocked. As a result of this "flipping" from one electrical state of the tube systems TA and TB to another, an abrupt change of potential is produced at the $pL$, $pR$ anode, which may be utilized for switching purposes. The flip-flops FF59 to FF50 of the described ring counter RC3 are coupled together in such a way that the line $s101$ connects the anode $pL$ of the TA vacuum-tube system of the flip-flop FF59 to the grid GL of the TA vacuum-tube system of the flip-flop FF58. The line $s100$ connects the anode $pL$ of the TA tube system of the flip-flop FF58 to the grid GL of the TA tube system of the flip-flop FF57; line $s99$ connects the anode $pL$ of the TA tube system of the flip-flop FF57 to the grid GL of the TA tube system of the flip-flop FF56; line $s98$ connects the anode $pL$ of the TA tube system of the flip-flop FF56 to the grid GL of the TA tube system of the flip-flop FF55; line $s97$ connects the anode $pL$ of the TA tube system of the flip-flop FF55 to the grid GL of the TA tube system of the flip-flop FF54; line $s96$ connects the anode $pL$ of the TA vacuum-tube system of the flip-flop FF54 to the grid GL of the TA tube system of the flip-flop FF53; line $s95$ connects the anode $pL$ of the TA tube system of the flip-flop FF53 to the grid GL of the TA tube system of the flip-flop FF52; line $s94$ connects the anode $pL$ of the TA tube system of the flip-flop FF52 to the grid GL of the TA tube system of the flip-flop FF51; line $s93$ connects the anode $pL$ of the TA tube system of the flip-flop FF51 to the grid GL of the TA tube system of the flip-flop FF50; and line $s115$ connects the anode $pL$ of the TA tube system of the flip-flop FF50 to the grid GL of the TA tube system of the flip-flop FF59.

A line $s102$ runs from the contact X of the first circuit to the grid GR of the TB tube system of the twin triode DT10 of the flip-flop FF50 and to the grid GL of the TA tube systems of the twin triodes DT11 to DT19 of the flip-flops FF51–FF59, serving to transmit negative pulses, which flip the flip-flops FF59 to FF50 of the ring counter RC3 from a conductive state to a nonconductive state, the ring counter resuming its initial position and thus being cleared.

The TB tube systems of the twin triodes DT10 to DT19 of the flip-flops FF59–FF50 of the ring counter RC3 are connected through the lines $s83$–$s92$ to the grids G0 to G9 of the twin triodes DT0 to DT4, while the cathodes $f0$ to $f9$ of the twin triodes DT0 to DT4 are connected to zero potential via a line $s116$ and to a potential of $+200$ volts through a line $s114$ and a relay contact $r1$, so that when the relay contact $r1$ is closed the cathodes $f0$ to $f9$ of the twin triodes DT0 to DT4 can substantially emit no electrons. In the lines $s103$ to $s112$ of the anodes $p0$ to $p9$ of the twin triodes DT1 to DT4 there are the electromagnets E0 to E9 (FIGS. 3 and 7), which actuate the setting pins 4 of the setting-pin carriage 3 of the accounting machine 1 and are connected to a positive potential through a line $s113$. The first negative pulse that reaches the cathodes $fR$ of the TB tube system of the twin triodes DT10 to DT19 lowers the potentials of the cathodes $fR$ of the TB tube system of the twin triodes DT10 to DT19, so that the potential of the grid GR becomes more positive than these cathode potentials and accordingly a plate current can flow in the TB tube system of the twin triode DT10 of the flip-flop FF50, thus flipping the tube DT10 from the left-hand conductive state to the right-hand conductive state, whereas all the other twin triodes retain their initial state, as the conductivity of these twin triodes DT19 to DT11 is increased by the rise of potential at the corresponding grid GR. This increases the potential of the anode $pL$ of the TA tube system of the twin triode DT10, producing a positive pulse that flows through the line $s115$ to the grid GL of the TA tube system of the twin triode DT19, raising the potential of this grid GL above the cathode potential of the TA tube system of the twin triode DT19, thus making the TA tube system of the twin triode DT19 of the flip-flop FF59 conductive and the TB system nonconductive. The resultant higher potential at the anode $pR$ of the TB tube system of the twin triode DT19 is transmitted through the line $s92$ to the grid G9 of the TA tube system of the twin triode DT4. Because of the positive potential of $+200$ volts applied to the cathode $f9$ of the TA tube system of the twin triode DT4 through the line $s114$ and the relay contact $r1$, the described rise of the potential at the grid G9 is insufficient to allow plate current to flow, so that the electromagnet E9 cannot attract the setting pin 4 positioned above it of the setting-pin carriage 3 in the accounting machine 1. Let us assume that the digit 9 is to be transferred from counter $Upr$ of the product memory device $Pr$ to the setting-pin carriage of the accounting machine 1: the relay R would open the relay contact $r1$, thus disconnecting the potential of $+200$ volts from the cathodes $f9$ to $f0$, so that the potential applied to the grid G9 is higher than that at the cathode $f9$ of the TA tube system of the twin triode DT4 with the potential conditions described above prevailing in the twin triode DT4, and a plate current flows to the electromagnet E9, which attracts the setting pin 4 of the setting-pin carriage 3, as a result of which the digit 9 is complementarily transferred from the ring counter RC3 to the setting-pin carriage 3. But if a digit 8 is to be transmitted instead of the digit 9, the relay contact $r1$ must remain closed after the first negative pulse reaches the ring counter RC3 via the line $s37$, so that no plate current flows in the twin triode DT4 as described above. After the first negative pulse enters the ring counter RC3, the twin triode DT19 is in the left-hand conductive state, while the twin triodes DT18 to DT10 are in the right-hand conductive state. The second negative pulse that then arrives flips the flip-flop FF59, thus making the TB tube system of the twin triode DT19 conductive, raising the voltage at the anode $pL$ of the TA tube system, causing a positive pulse to flow to the grid GL of the TA system of the twin triode DT18 of the flip-flop FF58, so that now the TA tube system of the twin triode DT18 is conductive, and the potential rises at the anode $pR$ of the TB tube system, which acts upon the grid GR of the TB tube system of the twin triode DT4 through the line $s91$. As a result, the TB tube system of the twin triode DT4 becomes conductive when the relay contact $r1$ is opened by the relay R. The electromagnet E8 then attracts a setting pin 4 of the setting-pin carriage 3, so that the digit 8 is set in the setting-pin carriage 3. The digits 7, 6, 5, 4, 3, 2, and 1 are complementarily transferred in the same manner from the product memory device $Pr$ to the ring counter RC3, the number of negative pulses required corresponding to the size of the digit to be transferred.

After the transfer of each digit a negative pulse, which is emitted by the closing of the switch X (FIG. 5) as the setting-pin carriage 3 returns, is transmitted over the line $s102$ to the grid GL of the A tube system of the twin triodes DT19 to DT11, and to the grid GR of the TB tube system of the twin triode DT10 of the flip-flops FF59 to FF50 of the ring counter RC3, thus switching RC3 to its initial state.

Mode of Operation

The mode of operation of the accounting machine with an electronic multiplying device is described below, using a multiplication problem involving the finding of the product of the multiplier 4567 and the multiplicand 678. In the formation of this product three different functions to be performed must be distinguished namely: first, keying the factor into the accounting machine 1, and, coordinated together with that feeding the factors into the multiplier and multiplicand memory devices M$k$ and M$d$, respectively, of the electronic multiplying device: second, forming the product in the product memory device P$r$ of the electronic multiplying device; and finally the step-by-step transfer of the product from the product memory device P$r$ to the accounting machine 1 via the tranfer device.

The keys 2 of the accounting machine 1 (FIG. 1) that correspond to the digits of the factors are successively depressed to enter these digits into the machine: the digits 6, 7, and 8 that constitute the multiplicand, and the digits 4567 that correspond to the multiplier. The vertical movement of the keys 2 (FIGS. 1, and 3) for each digit moves a setting pin 4 (FIGS. 1, 2, 3) in the columns K1 to K7 of the setting-pin carriage that corresponds to the decimal place. The carriage moves toward the left and is stopped by the spring 20 (FIGS. 2 and 3), so that the sixth setting pin 4 of column K7 is stopped for the $10^2$ decimal place of the multiplicand, the seventh setting pin 4 of the column K6 for the decimal place $10^1$ of the multiplicand, the eighth setting pin 4 of the column K5 for the decimal place $10^0$ of the multiplicand, the fourth setting pin of column K4 for the decimal place $10^3$ of the multiplier, the fifth setting pin 4 of the column K3 for the decimal place $10^2$ of the multiplier, the sixth setting pin 4 of column K2 for the decimal place $10^1$ of the multiplier, and the seventh setting pin 4 of the column K1 for the decimal place $10^0$ of the multiplier. At the same time the corresponding contacts 0 to IX (FIGS. 2 and 5) were closed in the contact groups UM$d$ to HM$d$ and UM$k$ toT$h$M$k$ assigned to these columns K1 to K7. Accordingly, the contact VI is closed in the contact group HM$d$, the contact VII is closed in the contact group TM$d$, and the contact VIII is closed in the contact group UM$d$. The contacts IV of contact group T$h$M$k$, V of contact group HM$k$, VI of contact group TM$k$, and VII of contact group UM$k$ are closed in the contact groups THM$k$ to UM$k$ of the multiplier memory device M$k$. During this procedure the setting-pin carriage 3 (FIG. 3) has jumped from column to column toward the left, so that at the end of this intermittent movement of the column K8 is positioned above the electromagnets E0 to E9 (FIGS. 3 and 7). In this position of the setting-pin carriage 3 the racks 5 of the accounting machine 1 (FIG. 1) run up against the said setting pins 4, thus transferring the factors to the clearing mechanism of the accounting machine 1 and printing them via the printing device 9.

Then the multiplying key 47 (FIGS. 3 and 6) is depressed, transmitting a start pulse through the line $s0$ to the flip-flop VF7 of the electronic multiplying device (FIG. 5), which is thereby flipped from its right-hand conductive to its left-hand conductive state. This produces a pulse that travels over the line $s1$ to the flip-flop FF0, flipping the latter and producing a pulse that travels along the line $s2$ to reach the gate G0 and switch the latter so that the pulses coming from system A of the pulse generator M (henceforth termed A pulses) travel through the lines $s3$ and $s4$ through the gate G0 to the flip-flop FF3 and through the lines $s4$ and $s5$ to the ring counter RC2. This actuating of the multiplying key 47 (FIG. 6) energizes the relay AR of the step-by-step switching device SR and switches all the contacts denoted by $a$ (FIGS. 5 and 6), while at the same time a "clear" pulse is transmitted via the line $s102$ to the ring counter RC3 (FIGS. 5 and 7), which returns the flip-flops FF59–FF50 of the ring counter RC3 to their initial state or, if they already are in that state, further lowers the negative potential applied to the grid GL of the TA tube system of the twin triodes DT19 to DT11 and to the grid GR of the TB tube system of the twin triode DT10, so that the states of the TA and TB tube systems of the twin triodes DT19 to DT10 of the flip-flops FF59 to FF50 in the ring counter RC3 remain unchanged.

The pulses reaching the flip-flop FF3 (FIG. 5) through the line $s4$ produce potential changes in the flip-flop, which reach the gate G3 through the line $s6$ and the gate G4 through the line $s10$, so that the gate G4 becomes nonconductive and gate G3 becomes conductive, and the pulses emitted by the B system of the pulse generator M (henceforth called B pulses) travel along the lines $s7$ and $s21$ to a gate G2, which is initially electrically nonconductive.

As described above, the first A pulse coming from the pulse generator M travels to the flip-flop FF39 of the ring counter RC2 through the lines $s3$ and $s4$, the gate G0, and the line $s5$. The resultant flipping of FF39 produces a pulse that travels to the open contact IX of the contact group UM$d$. The change of the electrical state of the flip-flop FF39 makes it possible for a second A pulse from the pulse generator M to travel through the lines $s3$ and $s4$, the gate G0, the line $s5$, and the flip-flop FF39 to the flip-flop FF38, flipping the latter. This generates a pulse which is transmitted through the contact VIII of the contact group UM$d$, closed by the corresponding setting pin 4, to the flip-flop FF10, flipping the latter as well. The pulse thereby produced is transmitted through the line $s27$ to the gate G10, which becomes electrically conductive. The third A pulse from the pulse generator M flips the flip-flop FF37 via the lines $s3$, $s4$, the gate G0, the line $s5$, and the flip-flops FF39 and FF38, so that a pulse likewise enters the gate G11 via the line $s76$, the contact VII of the contact group TM$d$, the line $s25$, the flip-flop FF11, and the line $s28$, thus making that gate likewise electrically conductive. The fourth A pulse from the pulse generator M similarly produces a pulse in the flip-flop FF36 of the ring counter RC2, which travels to the flip-flop FF12 via the line $s77$, the closed contact VI of the contact group HM$d$, and the line $s26$, the pulse produced in the flip-flop FF12 making gate G12 conductive.

The fifth to the tenth A pulses coming from the pulse generator M can only connect up the flip-flops FF35 to FF30, as none of the contacts V to 0 of the contact groups UM$d$, TM$d$, and HM$d$ are closed for the chosen multiplicand 678. The tenth A pulse reaching the ring counter RC2 flips the flip-flop FF30, thus switching the ring counter RC2 back to its initial position and producing a carry pulse from this ring counter RC2 that is transmitted via the lines $s8$, and $s9$ to the flip-flop FF29 of the ring counter RC1, generating a pulse in the latter, which travels over the line $s69$ to the open contacts IX of the contact groups UM$k$, TM$k$, HM$k$, and T$h$M$k$, and via the line $s8$ to the flip-flop FF3. This flips the flip-flop FF3, blocking the gate G3 and making the gate G4 conductive, so that the B pulse coming from the pulse generator M can no longer reach the gate G2 via the lines $s3$ and $s7$, the gate G3, and the line $s21$, through the tenth B pulse from the pulse generator reaches the flip-flops FF10, FF11, and FF12 via the lines $s3$, $s7$, and $s11$, the gate G4, and the lines $s12$, $s13$, and $s14$, flipping this flip-flop, the resultant pulses tripping the gates G10, G11, and G12 via the lines $s27$, $s28$, and $s29$ to their nonconductive state. The eleventh A pulse coming from the pulse generator M blocks the flip-flop FF3 for any further pulse transmission, via the lines $s3$, and $s4$ and the gate G0. The pulse produced by this eleventh A pulse in the flip-flop FF3 makes the gate G4 nonconductive and the gate G3 electrically conductive, so that eleventh to nineteenth pulses from the pulse generator M can again reach the gate G2 via the line $s7$, the gate G3, and the line $s21$, reinforcing the nonconductive state of the gate G2.

Besides flipping the flip-flop FF3, the eleventh pulse travels along the lines $s4$ and $s5$ to flip-flop FF39 of the ring counter RC2 in the same manner as is done by the first A pulse of the pulse generator M. The switching operations produced by the twelfth to the twentieth A pulses in the ring counter RC2, the flip-flops FF10 to FF12, the gates G10 to G12, and in the flip-flop FF3 are identical with the switching operations produced by the second to the tenth A pulses, so that after the twentieth A pulse the gates G10, G11, and G12 are conductive, and the flip-flop FF3 is flipped by the second carry pulse, thus blocking the gate G3 and making the gate G4 electrically conductive and advancing the switching of the ring counter RC1 via the lines $s8$ and $s9$, the twentieth A pulse that enters the ring counter RC2 producing a second carry pulse, which reaches the flip-flop FF29 of ring counter RC1 via the lines $s8$ and $s9$ and flip-flop FF29 of ring counter RC1, flipping this last flip-flop, with the resultant pulse reaching the contacts VII of the contact groups UM$k$ to THM$k$ via line $s68$. The twentieth B pulse from pulse generator M, which chronologically follows the twentieth A pulse, reaches the flip-flops FF10, FF11, and FF12 via lines $s7$ and $s11$, gate G4, and lines $s12$, $s13$, and $s14$, flipping these flip-flops and thus blocking the gates G10, G11, and G12 as described previously. The twenty-first to thirtieth A pulses then take over the functions of the first to tenth and eleventh to twentieth A pulses, while the thirtieth B pulse takes over the functions of the tenth and twentieth A pulses. The thirtieth A pulse releases the third carry pulse in ring counter RC2, which travels on the one hand via lines $s8$ and $s9$, and flip-flops FF29 and FF28 of ring counter RC1 to flip-flop FF27 of ring counter RC1, switching the latter, so that a pulse reaches flip-flop FF1 via the contact 7 of the contact group UM$k$, which is closed by a setting pin 4, line $s70$, and the contact $a_{10}$ closed by the step-by-step switching device SR, and line $s19$, the flipping of this flip-flop transmitting a pulse to gate G2 via line $s20$, making this gate electrically conductive, while on the other hand, this third carry pulse switches flip-flop FF3 via line $s8$ so as to block gate G3 and make gate G4 conductive. The thirtieth B pulse effects the blocking of gates G10, G11, and G12.

The thirty-first A pulse emitted by system A of pulse generator M flips the flip-flop FF39 of ring counter RC2 as described previously, via line $s3$, gate G0, and lines $s4$ and $s5$, at the same time flipping the flip-flop FF3 of the first circuit, so that gate G3 can transmit pulses again, while gate G4 is blocked, as was the case with the first, eleventh, and twenty-first pulses. The thirty-first B pulse from pulse generator M now travels along lines $s3$ and $s7$, gate G3, line $s21$, and gate G2 to gates G12, G11, and G10 via lines $s23$, $s22$, and $s21$. The blocking state of these gates G10 and G12 prevents this pulse from acting on the counters UP$r$, TP$r$, and HP$r$ of the product memory device P$r$. The thirty-second A pulse that reaches the ring counter RC2 flips the flip-flop FF38, so that the resultant pulse is transmitted via the closed contact VIII of contact group UM$d$ and lines $s75$ and $s24$ to flip-flop FF10, there producing a switching operation that generates a pulse, which makes gate G10 conductive, so that the thirty-second B pulse can travel along line $s7$, gate G3, line $s21$, gate G2, gate G10, and line $s30$ to the contact $a_0$, closed by the step-by-step switching device SR, in line $s31$ in the counter UP$r$ of the product memory device P$r$, which thus registers the digit 1.

The thirty-third A pulse from pulse generator M flips flip-flop FF37 via lines $s3$ and $s4$, gate G0, and line $s5$ so that a pulse is transmitted via the closed contact VII of contact group TM$d$ and lines $s76$ and $s25$ to flip-flop FF11, flipping the latter and making gate G11 conductive. Thereupon the thirty-third B pulse emitted by system B of pulse generator M can enter the counters UP$r$ and TP$r$ of the product memory device P$r$ via line $s7$, gate G3, line $s21$, gate G2, line $s22$, gates G10 and G11, line $s30$ with the closed contact $a_0$, and line $s35$ with the closed contact $a_1$, as a result of which the counter UP$r$ registers the digit 2 and the counter TP$r$ registers the digit 1. The thirty-fourth A pulse that reaches the ring counter RC3 after the thirty-third B pulse shifts the flip-flop FF36 to the conductive state, so that a pulse travels via line $s75$, the closed contact VI of the contact group HM$d$, and line $s26$ to the flip-flop FF12, flipping the latter so that gate G12 becomes conductive and hence the thirty-fourth B pulse traverses the line $s7$, gate G3, line $s21$, gate G2, lines $s22$ and $s23$, and gates G10, G11, and G12 to reach the counters UP$r$, TP$r$, and HP$r$ via lines $s30$, $s35$, and $s36$ and the closed contacts $a_0$, $a_1$, and $a_2$, thus causing the counter UP$r$ to register the digit 3, the counter TP$r$ the digit 2, and the counter HP$r$ the digit 1. Since the thirty-fifth to thirty-ninth A pulses merely advance the switching of flip-flops FF35–FF31 in ring counter RC2 via line $s3$, gate G0, and lines $s4$ and $s5$, owing to the open contacts V, IV, III, II, and I, the thirty-fifth to thirty-ninth B pulses can enter the UP$r$, TP$r$, and HP$r$ counters of the product memory device P$r$ readily via the lines, flip-flops, and gates described above, as well as the contacts $a_0$, $a_1$, and $a_2$, so that after the thirty-ninth B pulse the counter UP$r$ registers the digit 8, the counter TP$r$ the digit 7, and the counter HP$r$ the digit 6. This signifies that the multiplicand 678 has been multiplied once. The fortieth A pulse entering the ring counter RC2 from the A system of pulse generator M, via line $s3$, gate G0, and lines $s4$ and $s5$ flips the flip-flop FF30, returning ring counter RC2 to its initial state and at the same time transmitting the fourth carry pulse via lines $s8$ and $s9$ to ring counter RC1, which flips flip-flop FF26, the resultant pulse traversing line 66, the closed contact VI of contact group TM$k$, and line $s71$ to the open contact $b_{10}$ without producing any effect; on the other hand, this carry pulse flips flip-flop FF3 via line $s8$, so that gate G3 is blocked and gate G4 becomes conductive. The fortieth B pulse must now traverse lines $s7$ and $s11$, and FF12, the resultant pulses blocking gates G10, G11, and G12.

The forty-first to forty-ninth A pulses take over the functions of the thirty-first to thirty-ninth A pulses in such a manner that the forty-second to the forty-fourth A pulses successively make the gates G10, G11, and G12 conductive, and in the same sequence the forty-second to forty-ninth B pulses enter the counters UP$r$, TP$r$, and HP$r$ via line $s7$, gate G3, line $s21$, gate G2, lines $s22$ and $s23$, gates G10, G11, and G12, lines $s30$, $s35$, and $s36$ with the closed contacts $a_0$, $a_1$, and $a_2$, and the lines $s31$, $s32$, and $s33$, while the forty-first B pulse, like the thirty-first B pulse, is prevented from reaching the UP$r$ counters of the product memory device P$r$ by the electrical state of gates G10, G11, and G12. During the entrance of pulses thus described the counter UP$r$ reaches its full counting capacity 10 when it receives the forty-third B pulse, so that it is returned to zero, transmitting a carry pulse to the TP$r$ counter via line $s41$, blocking unit VF40 of the second circuit, and line $s43$, advancing that counter one digit for the incoming forty-third to forty-ninth pulses. The same action is produced by the incoming forty-fourth B pulse in the TP$r$ counter, returning the latter to zero and transmitting a carry pulse via line $s41$, blocking unit VF41, and line $s43$ to the HP$r$ counter of product memory device P$r$, thus advancing the latter by one for the incoming forty-fourth to forty-ninth B pulses, causing it to exceed its capacity of 10 upon receipt of the forty-sixth incoming B pulse, returning to zero and transmitting a carry pulse via line $s41$, blocking unit VF42, and line $s43$ to the THP$r$ counter, thus setting the latter to one.

As a result the number 1356 has been registered in the UP$r$, TP$r$, HP$r$, and THP$r$ counters of the product memory device P$r$, equivalent to the multiplication of the multiplicand 678 by 2.

Previously mentioned blocking elements VF40–VF43 are formed of monostable multivibrators, which are switched by a transfer pulse from one conductive state into the other conductive state. After a predetermined time the multivibrator automatically switches back into the original state. In this instance each monostable flip-flop produces a pulse which is coupled into the following counter as a transfer pulse from the preceding one. The time between the two flipping actions is the delay time which is influenced by the values of the R-C coupling elements. Thus the transfer pulse is not permitted to coincide with the product pulse. At the fiftieth A pulse the same switching operations occur as at the tenth, twentieth, thirtieth, and fortieth A pulses. Hence, ring counter RC2 transmits a carry pulse via lines $s8$ and $s9$ to ring counter RC1, which is then connected to flip-flop FF25, which in turn generates a pulse that runs to the open contact C10 via line $s65$ and the previously described closed contact V of contact group HM$k$, without being able to initiate any switching operations.

At the same time the fifth carry pulse travels over line $s8$ to flip-flop FF3, which is flipped, the resultant pulse blocking gate G3 and letting gate G4 become conductive. As a result, the fortieth B pulse travels via lines $s7$ and $s8$, gate G4, and lines $s12$, $s14$, and $s13$ to flip-flops FF10–FF12, causing them to flip, thus blocking gates G10, G11, and G12 via lines $s27$, $s28$, and $s29$.

The fifty-first A pulse, like the first, eleventh, twenty-first, thirty-first, and forty-first A pulses, flips the flip-flop FF39 of ring counter RC2, changing the conducting states of flip-flop FF3, gate G3, and gate G4, so that the fifty-first B pulse like the first, eleventh, twenty-first, thirty-first, and forty-first B pulses, is transmitted to the nonconductive gates G10, G11, and G12. The fifty-second A pulse makes gate G10 conductive, the fifty-third A pulse makes gate G11 conductive, and the fifty-fourth A pulse makes gate G12 conductive in the same manner as the twelfth, thirteenth, fourteenth, twenty-second, twenty-third, twenty-fourth, thirty-second, thirty-third, thirty-fourth, forty-second, forty-third, and forty-fourth A pulses, so that the fifty-second to fifty-ninth B pulses can enter the UP$r$ counter, the fifty-third to fifty-ninth B pulses can enter the TP$r$ counter, and the fifty-fourth to fifty-ninth B pulses can enter the HP$r$ counter of the product memory device P$r$. Once again, corresponding carry pulses are produced in these UP$r$, TP$r$, and HP$r$ counters of the product memory device P$r$ by the incoming pulses, by the fifty-third B pulse in counter UP$r$, by the fifty-sixth B pulse in counter TP$r$, and by the fifty-ninth B pulse in counter HP$r$. Thus the product memory device P$r$ registers the number 2034 after the fifty-ninth B pulse, indicating the multiplicand 678 has been multiplied by 3. The sixtieth A pulse that enters the ring counter RC2 generates the sixth carry pulse in flip-flop FF30, returning the ring counter RC2 to its initial state, and advancing ring counter RC1 via lines $s8$ and $s9$, so that a pulse is transmitted from flip-flop FF24 via line $s64$ and the closed contact IV of contact group THM$k$ to the open contact $d_{10}$ without actuating any circuit elements. At the same time this carry pulse is transmitted via line $s8$ to flip-flop FF3, as a result of which the electrical state of flip-flop FF3, of gate G3, and of gate G4 is changed, so that the sixtieth B pulse actuates flip-flops FF10, FF11, and FF12 via lines $s7$ and $s11$, gate G4, and lines $s12$, $s14$, and $s13$, so that the sixty-first B pulse that follows the sixty-first A pulse entering ring counter RC2 and flip-flop FF3 cannot actuate the counters UP$r$, TP$r$, HP$r$, and THP$r$ via line $s7$, gate G3, line $s21$, and gate G2. This can be done only by the B pulses that follow the sixty-second to sixty-ninth A pulses, which multiply the multiplicand 678 by 4 and register the number 2712 in the product memory device P$r$. The sixty-seventh B pulse reaching the UP$r$ counter produces a carry pulse, and the sixty-eight B pulse produces a carry pulse in the TP$r$ counter. The seventieth A pulse reaching ring counter RC2 generates the seventh carry pulse in the flip-flop FF30, which resets ring counter RC2 and, via lines $s8$ and $s9$, advances ring counter RC1, as the flip-flop FF23 in ring counter RC1 is connected only to the open contacts III of contact groups UM$k$, TM$k$, HM$k$, and THM$k$ of the multiplier memory device M$k$ via the lines $s63$, flip-flop FF3 being flipped at the same time, so that gate G4 again is made conductive and gate G4 blocked, the seventieth B pulse blocks gates G10, G11, and G12 through line $s7$, gate G4, lines $s12$, $s13$, and $s14$, and flip-flops FF10, FF11, and FF12, this blocking being canceled out for gate G10 by the seventy-second A pulse, for gate G11 by the seventy-third A pulse, and for gate G12 by the seventy-fourth A pulse, so that the seventy-second to seventy-ninth B pulses entering the UP$r$, TP$r$, and HP$r$ counters add the multiplicand 678 for the fifth time or multiply the multiplicand by 5, thus forming the product 3390. The sixty-sixth B pulse produces a carry pulse in the HP$r$ counter, which travels via line $s41$, blocking unit VF42, and line $s43$ to the THP$r$ counter, which registers the digit 3, while the seventy-ninth B pulse produces a carry pulse in the UP$r$ counter, which resets counter UP$r$ to zero and advances counter TP$r$ by one.

The eightieth A pulse, which enters ring counter RC2 via line $s4$, gate G0, and line $s5$, produces the eighth carry pulse in that counter, which returns counter RC2 to its initial state and advances, via lines $s8$ and $s9$, the ring counter RC1 to flip-flop FF22, which is connected to the open contacts II of contact groups UM$k$, TM$k$, and HM$k$ of the multiplicand memory unit and acts via line $s8$ upon flip-flop FF3, thus blocking gate G3 and making gate G4 conductive, so that the eightieth B pulse can change the conductivity states of gates G10, G11, and G12 via lines $s7$ and $s11$ and gate G4, this change being reversed only by the eighty-second to eighty-fourth A pulse, after the interrelated conductivities of gates G3 and G4 have been changed by the eighty-first A pulse.

Again the eighty-second to eighty-ninth B pulse travel successively through line $s7$, gate G3, lines $s21$, $s22$, and $s23$, gates G10, G11, and G12, lines $s30$, $s35$, and $s36$, closed contacts $a_0$, $a_1$, and $a_2$, and lines $s31$, $s32$, and $s33$ to the UP$r$, TP$r$, and HP$r$ counters. The multiplicand 678 has been added for the sixth time, or multiplied by 6, and the product 4068 has been formed. The eighty-third B pulse entering the TP$r$ counter produces a carry pulse, which is transmitted via line $s41$, blocking unit VF41, and line $s43$ to the HP$r$ counter, and the eighty-ninth B pulse entering the HP$r$ counter causes the latter to generate a carry pulse, which advances the THP$r$ counter through line $s41$, blocking unit VF42, and line $s43$.

The ninth carry pulse produced in ring counter RC2 by the ninetieth A pulse advances ring counter RC1 via lines $s8$ and $s9$ to flip-flop FF21, which is connected through line $s61$ to the open contacts 1 of contact groups UM$k$, TM$k$, and THM$k$, so that no further switching operations can be initiated there. Like the first to eighth carry pulses, the ninth carry pulse changes the electrical state of flip-flop FF3, and hence, of gates G3 and G4, so that as a result the ninetieth B pulse changes the electrical state of gates G10, G11, and G12 via line $s7$, gate G4, lines $s12$, $s13$, and $s14$, and flip-flop FF10, FF11, and FF12.

The ninety-first A pulse restores gate G3 to its conductive state via flip-flop FF3, while gate G4 is blocked. Thereupon the ninety-second, ninety-third, and ninety-fourth A pulses entering ring counter RC2 reach gates G10, G11, and G12 via lines $s25$, $s26$, $s27$, $s28$, and $s29$ and flip-flops FF10, FF11, and FF12.

This permits the ninety-second to ninety-ninth B pulses to enter the UP$r$, TP$r$, and HP$r$ counters as described previously, so that the multiplicand 678 is added for the seventh time, or multiplied by seven, which corresponds to the units place of the multiplier, yielding the product 4746, the ninety-third B pulse having produced a carry pulse in counter UP$r$ and the ninety-fifth B pulse having produced a carry pulse in counter TP$r$. Multiplication of the multiplicand 678 by $7 \times 10^0$ of the multiplier concludes the first partial multiplication. Thereupon the tenth carry pulse produced by the hundredth A pulse in ring counter RC2 travels via line $s8$ to flip-flop FF3, changing the electrical state of gates G3 and G4, and, via lines $s8$ and $s9$, advances ring counter RC1 to flip-flop FF20. This fills up the counting capacity of ring counter RC1. Here, too, an initial carry pulse is generated, which returns ring counter RC1 to its initial state and at the same time travels over line $s18$ to flip-flop FF5 of the first circuit, flipping the latter, thus again producing a pulse that reaches flip-flop FF1 via lines $s16$ and $s17$, the resultant pulse blocking gate G2 via line $s20$.

The pulse produced in flip-flop FF5 travels along line $s17$ to flip-flop FF0, which is flipped, so that gate G0 is closed via line $s2$, and no A pulses can enter the first circuit from system A of pulse generator M via lines $s3$ and $s4$. The pulse emitted by flip-flop FF0 actuates blocking unit VF40 via line $s39$, potentiometers R1 and R2, line $s40$, and the contact $a_5$, which is closed by the step-by-step switching device SR, so that no pulses coming from counter UP$r$ via line $s41$, blocking unit VF40 and line $s43$ can reach the TP$r$ counter, but are routed via line $s41$ and the closed contact $a_3$ to flip-flop FF00. Furthermore, this pulse generated in flip-flop FF5 traverses lines $s17$ and $s42$ to reach flip-flop FF00 of the second circuit, the flipping of this flip-flop sending a pulse to gate G00, making the latter conductive. A pulse can now enter ring counter RC3 (FIGS. 5 and 7) of the second circuit via line $s3$, gate G00, and line $s37$, and can enter product memory device P$r$ via line $s38$, initiating the transfer of the digit in the UP$r$ counter to the accounting machine 1.

Figure 6:
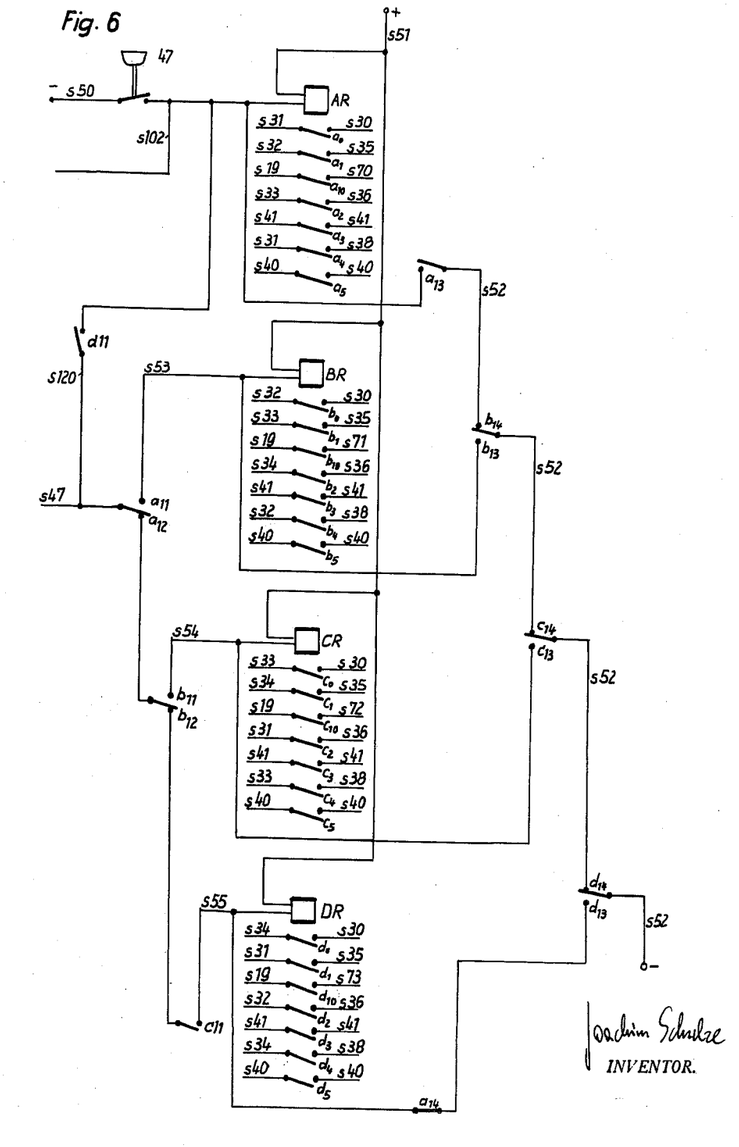
FIG. 6 is a schematic of a step by step switching device for setting of the electronic multiplier.

An initial A pulse traverses line $s3$, gate G00, and line $s38$ of the second circuit to transfer the digit 6 contained in counter UP$r$ through the closed contact $a_4$ to the UP$r$ counter, thus adding 1 to the digit 6. The same pulse travels along line $s37$ to reach ring counter RC3 and flip flip-flop FF50 there, making the TB tube system of the twin triodes DT10 of flip-flop FF50 (FIG. 7) conductive, thus producing a pulse at the anode $p$L of tube system TA of the twin triode DT10, which reaches the grid GL of twin triode DT19, changing the conductivity of twin triode DT19 and making tube system TA conductive. This enters the digit 9 in ring counter RC3 during the carry complementarily to the entrance of the pulse into the UP$r$ counter. The resultant higher potential of anode $p$R of the TB tube system of twin triode DT19 is applied via line $s92$ to grid G9 of tube system TA of twin triode DT4. Because of the positive potential of +200 volts applied to the cathode $f9$ of tube system TA of twin triode DT4 via line $s114$ and relay contact $r1$, the rise of potential at grid G9 described above is insufficient to allow plate current to flow, so that the electromagnet E9 is unable to attract the setting pin 4 positioned above it (FIG. 6). The second A pulse coming from system A of pulse generator M now enters counter UP$r$ as described above, via gate G00 and line $s38$ (FIG. 5), again adding 1 to the digit 7 stored there. The same pulse traverses gate G00 and line $s37$ to enter ring counter RC3, which it switches from flip-flop FF59 to flip-flop FF58 in the manner described above, so that the TA tube system of twin triode DT18 (FIG. 7) becomes conductive, as a result of which the potential rises at the anode $p$R of the TB tube system, this raised potential acting upon grid G8 of the TB tube system via line $s91$. Because the contact $r1$ is closed no emission current flows through the TB tube system of twin triode DT4. This transfers the digit 8 complementarily to ring counter RC3. The third A pulse again adds 1 to the digit 8 in the UP$r$ counter, while at the same time flipping flip-flop FF58 in ring counter RC3. This produces a pulse that travels to grid GL of twin triode DT17 in flip-flop FF57, making the TA tube system conductive, with the raised potential of the TB tube system of twin triode DT17 applied to grid G7 of twin triode DT3 without its being able to effect the flow of current. This enters the digit 7 in ring counter RC3. The fourth A pulse entering counter UP$r$ via gate G00, line $s38$, and the closed contact $a_4$ adds in to the digit 9 in counter UP$r$. Ring counter RC3 is set to 6 via line $s37$, through which current flows from the cathode $f$L to the anode $p$L of tube system TA in the twin triode DT16 of flip-flop FF56, so that a higher potential is applied to anode $p$R and thus simultaneously to grid G6 of twin triode DT3. The entrance of this fourth pulse into the UP$r$ counter completes the counting capacity of the UP$r$ counter (FIG. 5), so that it is reset to zero and transmits a carry pulse via line $s43$ and the closed contact $a_3$ to flip-flop FF00, flipping the flip-flop FF00 and thus blocking gate G00 for any further incoming pulses. The pulse produced when flip-flop FF00 is flipped travels through line $s45$ to the vacuum-tube amplifier RV, which amplifies the pulse, so that relay R is energized via line $s46$ and the relay contact $r1$ (FIG. 7) is opened. Hence, negative potential is applied to cathode $f6$ of tube system TB in twin triode DT3, so that the positive potential applied to grid G6 of the TB tube system of twin triode DT3 via line $s89$ causes an electron current to flow, which energizes electromagnet E6 via line $s109$, so that the sixth setting pin 4 of column K8 of the setting-pin carriage 3 in the accounting machine 1 is attracted and the digit 6 is transferred from the UP$r$ counter to the accounting machine 1.

From relay R the pulse generated in flip-flop FF00 passes along line $s47$ to the step-by-step switching device SR (FIG. 7), which switches from relay AR to relay BR, de-energizing relay AR of the step-by-step switching device SR, thus throwing all the relay contacts bearing the notation $a$, as described above. Relay BR of the step-by-step switching device is energized, and all the relay contacts bearing the notation $b$ are actuated.

This begins the return of the setting-pin carriage 3 (FIGS. 3 and 4) described above, during which the seventh setting pin 4 of column K1 is returned to its initial position in the setting-pin carriage 3 by the read-in plate 50 (FIG. 4), the contact VII of contact group UM$k$ in the multiplier memory device M$k$ opening, thus clearing the decimal place $10^0$ in the multiplier memory device M$k$. Now the column K9 of setting pins 4 of the setting-pin carriage 3 is positioned above the electromagnets E9 to E0.

The return of the setting-pin carriage 3 has closed contact X briefly, emitting a start pulse through line $s0$ in flip-flop VF7, which initiates the next partial multiplication of the multiplicand 678 by the multiplier decimal place $6 \times 10^1$. At the same time the closing of contact X returns the ring counter RC3 (FIG. 7) to its initial state via lines $s0$ and $s102$. During the occurrence of pulses numbers one hundred one through one hundred forty (101–140), the ring counter RC2 is passed through four times, so that it has sent four transfer pulses to the ring counter RC1. Flip-flop FF26 then applies a pulse to the closed contact $b_{10}$ on lead $s19$ of flip-flop FF1 via lead $s66$, the closed contact VI of the contact group TMK and lead $s71$. Flip-flop FF1 then switches gate G2 to a conducting condition. In addition, the flip-flops FF10–FF12 and gates G10–G12 have been switched on four times by the pulses through the multiplicand storer M$d$. Transfer pulses from the ring counter RC2 via lead $s8$ have also flipped flip-flop FF3 four times and permitted nine B-pulses to pass through gate G3 to gate G2 each time. At the same time four B-pulses, via leads $s7$, $s11$ and gate G4, flip flip-flops FF10–FF12 and gates G10–G12 into the off condition. After the 110th, 120th, 130th, and 140th A-pulses, the gates G10–G12 and flip-flops FF10–FF12 are conductive, G3 is closed and G4 conducts, while through the 110th, 120th, 130th, and 140th B-pulses the flip-flops FF10–FF12 remain switched, gates G10–G12 are closed, gate G4 conductive and G3 locked. The effect of the 101st–109th, 111th–119th, 121st–129th, and of the 131st–139th A- and B-pulses correspond exactly to the 1st–9th, 11th–19th, etc., A- and B-pulses. The 141st pulse, via lead $s3$, gate G0, leads $s4$ and $s6$, switches the flip-flop FF39 of the ring counter RC2 and the flip-flop FF3 of the first circuit arrangement, so that gate G3 can again pass pulses, while gate G4 is locked, as was the case on the eleventh, one hundred twenty-first, and one hundred thirty-first A-pulses. The 141st B-pulse passes from pulse generator M through gates G3, G2 to locked gates G10–12.

The 142nd A-pulse flips flip-flop FF38 in the ring counter RC2, which in turn flips flip-flop FF10 via closed contact VIII of the contact group UM$d$ and lead $s24$, so that gate G10 becomes conductive. The 143rd and 144th A-pulses pass through ring counter RC2 and the closed contacts VII and VI of the contact groups TM$d$, HM$d$, to flip flip-flops FF11 and FF12 and open gates G11 and G12. Accordingly the 142nd to 144th B-pulses pass through gates G3 and G2 and via the gates G11, G12, leads $s30$, $s35$, and $s36$ and the contacts $b_0$, $b_1$, and $b_2$ into the counters TP$r$, HP$r$, and THP$r$. The 144th B-pulse then causes storage in the counter which registers 7 in TP$r$, 9 in HP$r$ and 5 in THP$r$, while UP$r$ remains at 0. The 145th to 149th A-pulses flip flip-flops FF35–FF31 of the ring counter RC2 via lead $s3$, gate G0, leads $s4$ and $s5$. The open contacts V, IV, III, II, I, then cause the 145th–149th B-pulses to pass directly into the counters TP$r$, HP$r$, THP$r$, so that after the 149th B-pulse, counter TP$r$ registers 2, HP$r$5, THP$r$1, and UP$r$1. During this period, after the 146th B-pulse, the 147th B-pulse causes counter TP$r$ to produce a transfer pulse through locking and delay elements VF41 to HP$r$ and from HP$r$ through VF42 to THP$r$, and the 148th B-pulse results in a pulse from THP$r$ through locking element VF43 and lead $s44$ to counter UP$r$. The latter thus represents the highest decimal place in the product storer P$r$.

The multiplicand is transferred into the product storer with the 149th B-pulse during the formation of the second partial product which corresponds to a multiplication by 10. The 150th A-, B-pulses, just as with the 50th A-, B-pulses, flip FF30 of ring counter RC2, so that RC2 returns to the initial condition and generates the 5th transfer pulse via leads $s8$, $s9$, to the ring counter RC1, which switches flip-flop FF25. The pulse passes through closed contact V of HMK, leads $s65$ and $s72$ to open contact $c_{10}$. In addition the transfer pulse via lead $s8$ switches flip-flop FF3 which locks gate G3 and opens gate G4. Thus the 150th B-pulse flips flip-flops FF10–FF12, and locks gates G10–G12. The 151st to 159th A-pulses follow the action of the 31st–39th A-pulses, so that gates G10, G11, G12, are made sequentially conductive by pulses 152 through 154. In the same sequence the 152nd–159th B-pulses pass through lead $s7$, gate G3, lead $s21$, gate G2, leads $s22$, $s23$, gates G10, G11, G12, and leads $s30$, $s35$, $s36$ with the closed contacts $b_0$, $b_1$, $b_2$, and lead $s32$, $s33$, and $s34$, into the counters TP$r$, HP$r$, and THP$r$. The 151st B-pulse however, can not pass through the locked gates G10–G12. As a result counter TP$r$ registers 0, HP$r$3, THP$r$8, and UP$r$1. On the 159th B-pulse, counter TP$r$ generates a transfer pulse to HP$r$, and after the 157th B-pulse produces a transfer pulse to counter THP$r$. The product storer thus stores the figure 18300. The multiplicand has thus been multiplied by 20, and added to the 4740, which had remained in the product storer P$r$ after the first partial multiplication. On the 160th A-pulse the switching processes of the 10th, 20th, 30th, and 140th A-pulse are repeated. A 6th transfer pulse appears in ring counter RC2, which switches FF24 of ring counter RC1. This supplies a pulse through the closed contact IV of the contact group THMK and leads $s64$, $s73$ to open contact $d_1$, where it remains without effect. At the same time the 6th transfer pulse continues toward flip-flop FF3, which locks gate G3 and makes gate G4 conductive. Thereafter the 160th B-pulse switches flip-flops FF10–FF12 and closes the gates G10 to G12. The 161st A-pulse repeats the same switching processes as the 151st, and the 161st B-pulse like the 151st B-pulse passes through gates G3 and G2 while gates G10, G11, and G12 are non-conductive. The 162nd–164th A-pulses switch flip-flops 38–36 of the ring counter RC2. These pulses pass via the leads $s75$, $s76$, $s77$ and the closed contacts VIII, VII, VI of the contact groups UM$d$, TM$d$, HM$d$, as well as leads $s24$, $s25$, $s26$ to flip-flops FF10–FF12, which open gates G10–G12. The 162nd–169th B-pulses can then enter the product storer P$r$. The 162nd–169th A-pulses however, switch only the ring counter RC2. With the occurrence of the 169th B-pulse, the multiplicand 678 has been multiplied by 30, and the product storer P$r$ registers 25080. The counter TP$r$ portions stores 8, HP$r$ 0, THP$r$ 5, and UP$r$ 2 which has a value of $10^4$. After the 165th and 169th B-pulses a transfer pulse passes from HP$r$ and THP$r$ to the following counter. The 170th A-pulse generates the 7th transfer pulse in ring counter RC2, which switches FF23 of the ring counter RC1 via lead $s63$, and open contacts III of contact groups UMK, TMK, HMK, and THMK of the multiplier storer MK. At the same time flip-flop FF3 is flipped by the 7th transfer pulse, so that the gate G4 becomes conductive and gate G3 locked. The same action is repeated for the 180th and 190th A-pulses and for the 8th and 9th transfer pulses from RC2. The 170th, 180th, 190th B-pulses also repeat the action of the 160th B-pulse and switch flip-flops FF10–FF12 to lock gates G10–G12. The 171st, 181st and 191st A-pulses only flip flip-flop FF39, while the 172nd–174th, 182nd–184th, and 192nd–199th A-pulses pass in sequence through flip-flops FF38, FF37, FF36, via leads $s24$, $s25$, $s26$ to activate flip-flops FF10–FF12, and open gates G10–G12. The 172nd–179th, 182nd–189th, and 192nd–199th B-pulses can then pass into the product storer. After the 199th B-pulse the multiplicand 678 has been multiplied by 60, so that the product storer new partial product is 45420, with the tens place being transferable into the accounting machine. On the 173rd, 185th and 197th B-pulse, the counter TP$r$ supplies a transfer pulse to counter HP$r$. After the 178th, 184th, 196th B-pulse counter HP$r$ provides transfer pulses to the counter THP$r$, which in turn supplies a transfer pulse to the UP$r$ counter after the 195th B-pulse. The 10th transfer pulse caused by the 200th A-pulse in the ring counter passes through lead $s8$ to flip-flop FF3, and switches gates G3, G4, and also passes through leads $s8$, $s9$ to switch flip-flop FF20 of ring counter RC1. RC1 then reaches its maximum counting capacity, sending a transfer pulse through lead $s18$ to the flip-flop FF5 and then returns to its starting condition.

All the switching actions triggered by the 100th A-pulse are thereafter repeated. In addition the pulse from flip-flop FF0 passes through lead $s39$, voltage divider R1, R2, lead $s40$, and the contact $b_5$ closed by the step-switch device SR on the locking element VF41. As a result no pulses from counter TP$r$ can enter the counter HP$r$ via leads $s41$, $s43$, lock element VF41, but pass through closed contact $b_3$ to flip-flop FF00. The pulse produced in flip-flop FF5 at the same time is applied (leads $s17$ and $s42$), to the flip-flop FF00 of the second current circuit arrangement via gate G00, which is then switched to pass the A-pulse through lead $s3$, and lead $s37$ to ring counter RC3 and via lead $s38$ to the product storer P$r$. The action then permits transfer of the number from the counter TP$r$ into accounting machine 1. After completion of the entry of the value from counter TP$r$ into column 9 of the adjustment pin carriage 3, the step-switch device SR then switches over to the relay CR, so that the contacts c are closed, while a, b and d are opened.

The described mode of operation of accounting machine 1 with an electronic multiplying device is successively repeated for each decimal place of the multiplier, the counters in the product memory device, whose stored digits have been transferred to the accounting machine 1, being available for storing carries from the counter that is storing the highest decimal place. Thus, if the UPr counter (FIG. 5) is reset to zero after the digit it contains has been transferred to the accounting machine 1, it accepts the resultant digits of the $10^4$ decimal place of the product, if the capacity of the THPr counter has been exceeded, carry pulses entering the UPr counter from the THPr counter via line s41, blocking unit VF43, and line s44.

After the step-by-step multiplication of the multiplicand by the multiplier has thus been effected by repeatedly adding the multiplicand, the digits of the $10^4$, $10^5$, and $10^6$ decimal places of the product 3096426 have been successively transferred to the accounting machine 1 as has been described for the digit $6 \times 10^0$. According to the product 3096426, after multiplication is complete the UPr counter contains the digit 9 of the $10^4$ decimal place, the TPr counter contains the digit 0 of the $10^5$ decimal place, and the HPr counter contains the digit 3 of the $10^6$ decimal place, the number 6426 having already been transferred to the accounting machine 1. After this transfer, closure of the contact X (FIGS. 3 and 5) initiates a new partial multiplication as the setting-pin carriage 3 has not yet reached its initial position. A pulses are transmitted from the A system (FIG. 5) of pulse generator M via lines s3 and s4, gate G0, and line s5 to the ring counter RC2, switching the latter from one flip-flop to the next until its counting capacity has been attained and it is returned to its initial state, while carry pulses are sent via lines s8 and s9 to ring counter RC1, these carry pulses in turn switching this counter from one flip-flop to the next because the contacts VII of the contact group UMk, VI of contact group TMk, V of contact group HMk, and IV of contact group THMk are successively opened during the partial multiplication of the multiplicand by the multiplier. After the tenth carry pulse issued by ring counter RC2, ring counter RC1 reaches its counting capacity and sends a carry pulse via line s18 to flip-flop FF5, which acts upon flip-flop FF0 via lines s16 and s17 and, as described above, on gate G0 and via lines s16 and s42 upon flip-flop FF00, which is flipped, the resultant pulse making gate G00 conductive as well, so that A pulses enter ring counter RC3 via line s3, gate G00, and line s37, switching that counter, and entering counter UPr via gate G00, line s37, and line s38, until this counter sends a carry pulse through line s41, which interrupts the entrance of pulses into counter UPr and ring counter RC3. This pulse sequence is repeated during the described return of the setting-pin carriage 3 to its initial position, together with the simultaneous switching of the step-by-step switching device SR, until the contact X no longer initiates start pulses in flip-flop VF7. Thus the entire product 3096426 has been transferred to the setting-pin carriage 3 (FIGS. 2 and 3) of accounting machine 1, the setting pin 4 of column K8 representing the digit 6, the setting pin 4 of column K9 representing the digit 2, the setting pin 4 of column K10 representing the digit 4, the setting pin 4 of column K11 representing the digit 6, the setting pin 4 of column K12 representing the digit 9, the setting pin 4 of column K13 representing the digit 0, and the setting pin 4 of column K14 representing the digit 3, so that the product can be transferred by the racks 5, 6, and 7 (FIG. 1) to the clearing mechanism 8 and the storage mechanism 10 and to the printing device 9 of the accounting machine 1.

While a specific embodiment of the invention has been shown and described in detail to illustrate the application of the invention principles, it will be understood that the invention may be embodied otherwise without departing from such principles. The invention is defined in the appended claims.

What is claimed is:

1. In an accounting machine, a multiplying device having a digital decade multiplicand counter, a digital decade multiplier counter, carriage means having a first portion for setting digital multiplicand and multiplier entries into said multiplicand counter and said multiplier counter and a second portion for presenting the product thereof, said carriage means adapted to be moved in one direction upon setting in said entries, driving means adapted to return said carriage after completion of said entries, product memory means including a plurality of interconnected decade ring counters each responsive to one of progressive orders of decimals and adapted to respond to recycling of each ring counter of lower decimal order, switching means successively transmitting every decimal order of said multiplicand entry into a separate ring counter of said product memory means, the number of said successive transmissions being equal to the number of said multiplier entry digits in sequence of their decimal orders, connector means sequentially applying the progressive decimal orders to said plurality of ring counters after each sequential operation of said switching means and selectively interconnecting said multiplicand and multiplier counters and said product memory means, means actuating said driving means and connector means, transfer means transmitting the lowest decimal order in said product memory means to said second portion of said carriage means for storage after each sequential operation of said switching means, said transfer means transmitting the remaining decimal orders in said product memory means after the last sequential operation of said switching means.

2. In an accounting machine, a multiplying device having a digital multiplicand counter, a digital multiplier counter, carriage means having a first portion for setting digital multiplicand and multiplier entries into said multiplicand counter and said multiplier counter and a second portion for presenting the product thereof, said carriage means adapted to be moved in one direction upon setting in said entries, driving means adapted to return said carriage after completion of said entries, product memory means including a plurality of interconnected ring counters each responsive to one of progressive digital orders and adapted to respond to recycling of each ring counter of lower digital order, trigger means adapted to continuously produce a first and a second series of alternating pulses, gate means responsive to said first series of pulses adapted to successively admit the number of said second pulses corresponding to every digital order of said multiplier entry into a separate ring counter of said product memory means, the number of said successive admittances being equal to the number of said multiplier entry digits in sequence of their digital orders, relay connector means responsive to said first pulses to sequentially apply the progressive digital orders to said plurality of ring counters after each sequential operation of said gate means and selectively interconnecting said multiplicand and multiplier counters and said product memory means, switch means actuating said driving means and connector means, transfer means transmitting pulses equal to lowest digital order in said second portion of said product memory means to said carriage means for storage after each sequential operation of said gate means, said transfer means transmitting pulses equal in number to each of the remaining digital orders in said product memory means after the last sequential operation of said gate means.

3. In an accounting machine, a multiplying device as set forth in claim 2, said multiplier counter, said multiplicand counter and said ring counters in said product memory means including decade ring counters.

4. In an accounting machine, a multiplying device as set forth in claim 2, said transfer means including ring counter means adapted to magnetically actuate said second portion of said carriage means.

5. The device of claim 2 wherein said driving means includes a motor and cam.

6. The device of claim 4 including means clearing said entry settings on said first carriage portion upon said return movement of said carriage.

7. The device of claim 4 including means mounted on said carriage to successively interrupt and then continue said carriage return movement and said sequential operation of said connector means after transfer of each digital order pulse to said second carriage portion to permit recycling of said transfer means.

8. In an accounting machine, a multiplying device as set forth in claim 4, a printing device responsive to said means sequentially transmitting the lowest digital order in said product memory means to said carriage.

9. In an accounting machine, a multiplying device as set forth in claim 4, said second carriage portion including mechanical means storing said lowest digital order transmitted by said means sequentially transmitting the lowest digital order for storing said digital order.

10. In an accounting machine, a multiplying device as set forth in claim 9, said product memory means including a plurality of decimal counters and a plurality of blocking flip-flop circuits, said blocking flip-flop circuits adapted to delay the occurrence of a digital order pulse to prevent interference with said series of pulses.

11. In an accounting machine, a multiplying device as set forth in claim 9, said multiplicand counter including ten flip-flop circuits.

12. In an accounting machine, a multiplying device as set forth in claim 9, said multiplier counter including ten flip-flop circuits connected for ring counter action.

13. In an accounting machine, a multiplying device having a carriage shiftable to a plurality of digital places, a multiplier counter including a decimal ring counter and three sets of first entry switches controlling said ring counter, a multiplicand counter including a decimal ring counter and four sets of second entry switches controlling said multiplicand ring counter, means on said carriage for entering a multiplicand into said first entry switches, means on said carriage for entering a multiplier into said second entry switches, said carriage being adapted to be moved in one direction upon setting in said entries, driving means adapted to return said carriage after completion of said entries, carriage tabulating means for presenting the product of said multiplicand and multiplier, product memory means including a plurality of interconnected ring counters each responsive to a decimal order and adapted to respond to recycling of each ring counter of lower decimal order, trigger means adapted to continuously produce a first and a second series of alternating pulses, gate means responsive to said first series of pulses adapted to successively admit said second pulses equal to every decimal order of said multiplier entry into a separate ring counter of said product memory means, the number of said successive admittances being equal to the number of said multiplier entry digits in sequence of their decimal orders, connector means responsive to said first pulses to sequentially apply the progressive decimal orders to said plurality of ring counters after each sequential operation of said gate means and to selectively interconnect said counters, switch means actuating said driving means and connector means, a product ring counter responsive to said product memory means, transfer means transmitting pulses equal to the lowest decimal order in said product memory means to said product ring counter after each sequential operation of said gate means, said transfer means transmitting pulses equal in number to each of the remaining decimal orders in said product memory means after the last sequential operation of said gate means, said product ring counter sequentially transmitting the decimal orders to said carriage tabulating means of said cariage, and printing means in said carriage responsive to said product ring counter.

References Cited in the file of this patent

UNITED STATES PATENTS

| | | |
|---|---|---|
| 2,575,331 | Compton et al. | Nov. 20, 1951 |
| 2,895,672 | Dickinson | July 21, 1959 |
| 2,923,472 | Whitney | Feb. 2, 1960 |

UNITED STATES PATENT OFFICE
CERTIFICATE OF CORRECTION

Patent No. 3,034,721

May 15, 1962

Joachim Schulze

It is hereby certified that error appears in the above numbered patent requiring correction and that the said Letters Patent should read as corrected below.

Column 20, line 64, strike out "second portion of said " and insert the same after "said" in line 65, same column 20, column 22, line 34, for "cariage" read -- carriage --.

Signed and sealed this 4th day of September 1962.

(SEAL)
Attest:

ERNEST W. SWIDER
Attesting Officer

DAVID L. LADD
Commissioner of Patents